United States Patent [19]

Kemp

[11] Patent Number: 4,569,148
[45] Date of Patent: Feb. 11, 1986

[54] HOOK POSITIONER AND RIG

[76] Inventor: Wallace W. Kemp, 5192 SW. 27 Ave., Fort Lauderdale, Fla. 33312

[21] Appl. No.: 627,652

[22] Filed: Jul. 2, 1984

[51] Int. Cl.$^4$ .............................................. A01K 83/00
[52] U.S. Cl. .................... 43/43.1; 43/43.16
[58] Field of Search ................. 43/44.82, 43.1, 43.16, 43/44.8, 44.83

[56] References Cited

U.S. PATENT DOCUMENTS

| | | | |
|---|---|---|---|
| 454,581 | 6/1891 | Mack | 43/44.82 |
| 2,616,208 | 11/1952 | Stogermayr | 43/44.83 |
| 2,618,097 | 11/1952 | Johnstone | 43/44.8 |
| 2,640,291 | 6/1953 | Garner | 43/44.82 |
| 2,780,886 | 2/1957 | Rach | 43/44.83 |

Primary Examiner—Gene P. Crosby
Attorney, Agent, or Firm—Eugene F. Malin

[57] ABSTRACT

A fish hook rig including a combination hook positioner, hooks and line connector. The hook positioner includes a bent wire main body with transverse portions at generally various angles or parallel to another transverse portion along the longitudinal portions. The transverse portions are for placement of a separate hook eye over each different transverse portion of the hook positioner with the shank of the hook positioned along and adjacent to the general longitudinal center line of an adjacent longitudinal wire portion. The shank of each hook is bound by the connector such as fishing line to the hook positioner to position the plane in which the arcuate hook portion and barb of a first hook lies in a position generally at a desired angle relative to a second hook in the same or another plane that is also connected to the hook positioner.

5 Claims, 9 Drawing Figures

U.S. Patent  Feb. 11, 1986  4,569,148
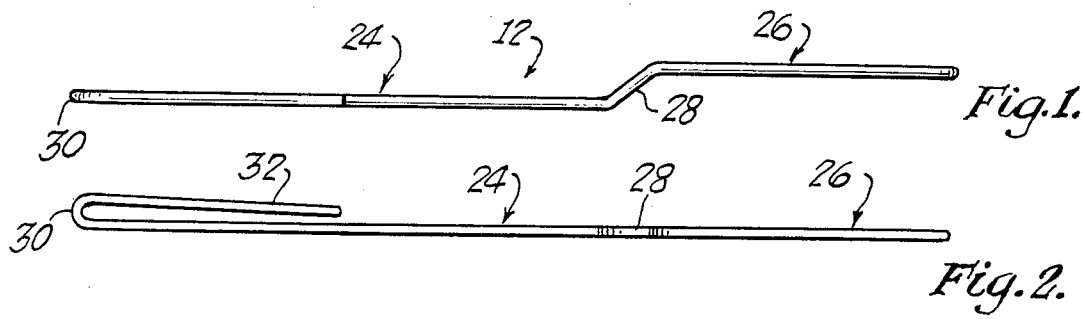
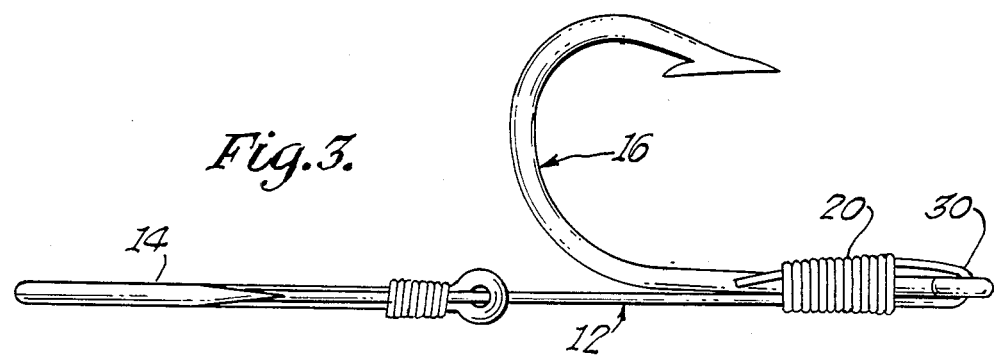
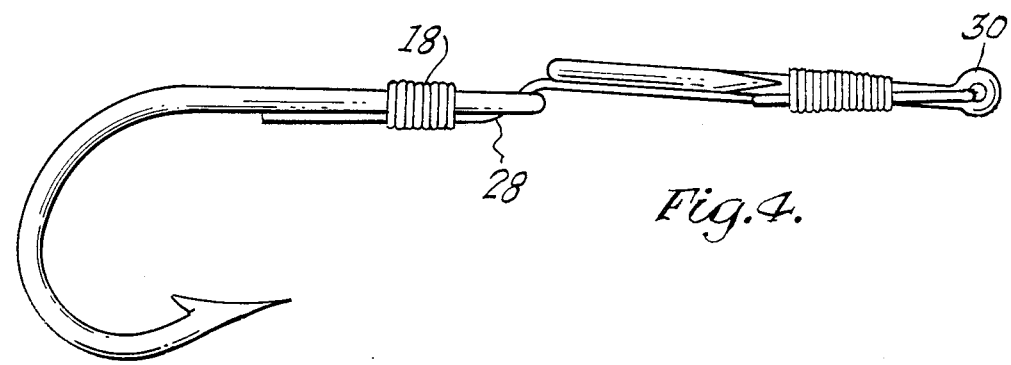
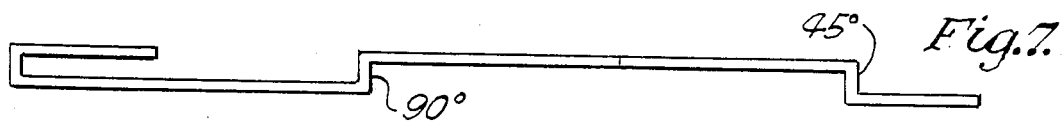
  
Fig.5.  Fig.9.  Fig.6.

HOOK POSITIONER AND RIG

BACKGROUND OF THE INVENTION

The present invention in this case is to a hook positioner having a main body with at least two longitudinal portions and transverse means with at least two transverse positioning connector portions. The transverse means are connected to the main body with the two or more transverse positioning connector portions positioned with respect to the main body to aid in fixing the position of hooks in relationship to the longitudinal portions.

In the past, hook positioners took the form of a rivet or an axle with large end as shown in U.S. Pat. No. 454,581 and U.S. Pat. No. 2,618,097 clamping hook positioners such as shown in U.S. Pat. No. 2,640,291 have been used to fix the position of hooks.

SUMMARY OF THE INVENTION

This invention is to a new and improved combination of a hook positioner, at least two hooks and a connector means that may be combined to provide a fish hook rig means. The hook positioner includes a bent piece of work with at least two transverse means or portions lying in planes positioned generally parallel or at an angle to one another along a longitudinal center line of one of the longitudinal portinos of the piece. The transverse means are used to position the eyes of the fish hooks. The shank of the fish hooks are placed along and adjacent to the general longitudinal center lines of the longitudinal portions of the fish hook. The eye of a first hook is placed over a different transverse means of the hook positioner. The shank of the first hook is then bound by a connecting means such as a line to the hook positioner to position the plane of the arcuate portion and barb of the first hook in a plane generally at to the second hook with its eye placed over the second transverse means portion of the hook positioner and the shank of the second hook bound by connecting means to the second longitudinal portion of the hook positioner.

It is an object of this invention to produce a wire hook positioner with two or more transverse bend means, each in a plane to position and allow an adjacent hook to be fixed in position on a hook positioner.

In accordance with these and other objects which will be apparent hereinafter, the instant invention will now be described with particular reference to the accompanying drawings.

BRIEF DESCRIPTION OF THE DRAWING

In the drawing:

FIG. 1 is a side view of the hook positioner.

FIG. 2 is a top view of the hook positioner shown in FIG. 1.

FIG. 3 is a side view of the finishing hook rig with hooks connected on the hook positioner shown in FIG. 1.

FIG. 4 is a top view of the fishing hook rig with hooks connected on the hook positioner as shown in FIG. 2.

FIG. 5 is a side view of another embodiment of a transverse portion.

FIG. 6 is a side view of another embodiment of a transverse portion.

FIG. 7 is a side view of another embodiment of the hook positioner.

FIG. 8 is a side view of another embodiment of the hook positioner.

FIG. 9 is an end view of FIG. 8.

DESCRIPTION OF THE PREFERRED EMBODIMENT

Referring now to the drawings and FIGS. 1 through 4 the fishing hook rig 10 includes a hook positioner 12, at least two hooks 14 and 16 and connecting means 18 and 20. The hook positioner shown in FIGS. 1 and 2 includes a main body or piece 22 with two long longitudinal portions or shaft portions 24 and 26 positioned generally parallel to one another. These portions may be in other positions for particular purposes. Between the two longitudinal shaft portions 24 and 26 is a first transverse means or portion 28 that interconnects the two longitudinal shaft portions 24 and 26. The first arcuate portion 28 is generally S-shaped. At the distal end of one of the longitudinal shaft portions, the first shaft portion 24, is a second transverse portion 30. The second transverse portion 30 is generally in the shape of a half circle. A trailing portion 32 is bent back over longitudinal portion 24.

FIGS. 5 and 6 show that the transverse portions 30' and 28' may be bent with different shapes.

Referring to FIGS. 3 and 4, the combination hook positioner 12, hooks 14 and 16 and connector means 18 and 20, such as fishing line wrapped around the shanks and secured to the fishing hooks, include the bent piece with a first transverse portion and a second transverse portion 28 and 30 respectively. Each transverse portion lies in a plane positioned at any desired angle or parallel to one another. In the figures the transverse portions are generally ninety degree angle to one another. The transverse portions are spaced apart along a longitudinal center lines of the hook positioner 12. Separate hooks with shanks are positioned along and adjacent to the general longitudinal center lines of the hook positioner. The eyes of the hooks are placed over a different transverse portion of the hook positioner. The shank of each hook is then bound by the connector means such as line to the hook positioner. The transverse portion and barb of each hook is shown positioned in a plane generally at ninety degrees to one another.

FIGS. 7, 8 and 9 show the longitudinal portions connected by different embodiments of transverse portions at angles other than at ninety degrees to other transverse portion. The end view FIG. 9 illustrates that the plane in which the transverse portion lies with the longitudinal portion may be at any angle in relationship to another transverse portion. For example, at least two hooks can be placed on transverse portions having a ninety degree relationship to each other and additional hooks on additional transverse portions in parallel or at a forty-five degree angle to one another.

The body 24 may be made of a circular piece of metal wire such as stainless steel, but stiff plastic or other material may be used.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A hook positioner for use in a fishing hook rig that includes at least two hooks each with eyes, a shank connected to the eye, an arcuate portion connected to the shank and a barb connected to the arcuate portion all of which generally lies in a hook plane, and connector means to bind the hook to said hook positioner, said hook positioner comprising:

a main body, and transverse means connected to said main body, said main body including at least two longitudinal portions, said two longitudinal portions including a first longitudinal portion, and a second longitudinal portion, said transverse means including at least two transverse positioning connector portion means, said two transverse positioning connector portion means including a first transverse connector portion means and a second transverse connector portion means, said first transverse connector portion means interconnected between said first longitudinal portion and said second longitudinal portion, said first transverse connector portion means being for positioning in the eye of a first hook in order to position said hook plane of a first hook relative to said hook plane of a second hook, said second transverse connector portion means positioned at the distal end of one of said longitudinal portions, said second transverse connector portion means being for positioning in the eye of said second hook in order to position said hook plane of said second hook relative to said hook plane of said first hook.

2. A hook positioner as set forth in claim 1, wherein:
said second transverse connector portion means is positioned generally at a ninety degree angle to said first transverse connected portion means.

3. A hook positioner as set forth in claim 1, wherein:
said longitudinal portions are positioned generally parallel to one another.

4. A hook positioner as set forth in claim 3, including:
said first hook having said eye, shank, arcuate portion and barbs generally in one plane, said second hook having said eye, shank, arcuate portion and barbs generally in one plane, said eye of said first hook positioned around said first transverse means, said eye of said second hook positioned around said second transverse means, said shank of said first hook positioned along one of said two longitudinal portions, said shank of said second hook positioned along the other of said two longitudinal portions, and connector means connecting each shank to the adjacent one of said two longitudinal portions.

5. A hook positioner as set forth in claim 4, wherein:
said connector means is fishing line;

said main body and transverse means and said connector means being the sole structure permanently positioning said hooks relative to one another.

* * * * *